(12) United States Patent
Blanke (10) Patent No.: US 8,684,277 B2
(45) Date of Patent: Apr. 1, 2014

(54) MULTI-LAYER BUILD-UP SYSTEM FOR FLOOR COVERINGS WHEN USING FLOOR HEATING SYSTEMS

(75) Inventor: Peter Wilhelm Blanke, Iserlohn (DE)

(73) Assignee: Blanke GmbH & Co. KG, Iserlohn (DE)

( * ) Notice: Subject to any disclaimer, the term of this patent is extended or adjusted under 35 U.S.C. 154(b) by 1235 days.

(21) Appl. No.: 11/906,871

(22) Filed: Oct. 4, 2007

(65) Prior Publication Data

US 2008/0083833 A1 Apr. 10, 2008

(30) Foreign Application Priority Data

Oct. 4, 2006 (DE) .................... 20 2006 015 397 U (51) Int. Cl.
*F24D 3/14* (2006.01)
*E04F 13/08* (2006.01)

(52) U.S. Cl.
USPC ............. 237/69; 52/388; 52/302.1; 428/44

(58) Field of Classification Search
USPC .................... 237/69; 52/388, 302.1
See application file for complete search history.

(56) References Cited

U.S. PATENT DOCUMENTS

| | | | | |
|---|---|---|---|---|
| 3,625,807 | A * | 12/1971 | Beemer | 428/494 |
| 4,546,024 | A * | 10/1985 | Brown | 428/44 |
| 4,698,249 | A * | 10/1987 | Brown | 428/44 |
| 6,805,298 | B1 * | 10/2004 | Corbett | 237/69 |
| 7,624,551 | B2 * | 12/2009 | Thronicke et al. | 52/388 |
| 7,698,862 | B2 * | 4/2010 | Thronicke et al. | 52/388 |
| 7,730,687 | B2 * | 6/2010 | Thronicke et al. | 52/388 |
| 2003/0215617 | A1 * | 11/2003 | Shehata et al. | 428/196 |
| 2007/0130858 | A1 * | 6/2007 | Thronicke et al. | 52/302.1 |
| 2010/0055405 | A1 * | 3/2010 | Schlueter | 428/156 |

FOREIGN PATENT DOCUMENTS

| | | | | |
|---|---|---|---|---|
| DE | 2535522 | A * | 2/1977 | |
| DE | 81 07 402 | U1 | 12/1982 | |
| DE | 3130550 | A1 * | 2/1983 | H05B 3/28 |
| DE | 87 03 642 | U1 | 6/1987 | |
| EP | 1911905 | A3 * | 3/2011 | |
| JP | 2002-267196 | A * | 9/2002 | F24D 13/02 |
| WO | WO2005/045153 | A1 * | 5/2005 | |

OTHER PUBLICATIONS

Thronicke et al., WO 2005/045153 A1, May 19, 2005 machine translation.*
Manual of Modern Hydronics, 2004, IPEX, Second Edition.*
Oxford English Dictionary, Second Edition, 1989, definition of "curing", accessed from www.oed.com.*
Thronicke et al., WO 2005/045153 A1, May 19, 2005 English machine translation.*

* cited by examiner

*Primary Examiner* — Kang Hu
*Assistant Examiner* — Phillip E Decker
(74) *Attorney, Agent, or Firm* — Maine Cernota & Rardin (57) ABSTRACT

A multi-layer build-up system for floor coverings when using floor heating systems, particularly for laying ceramic floor coverings using the thin-bed method, has, on the underside, an essentially plate-shaped component for planar laying and for the accommodation of pipelines of a floor heating system. Component accommodation spaces for the pipelines are formed in the plate-shaped component and an uncoupling mat is disposed on the surface of the plate-shaped component. The uncoupling mat has an uncoupling layer on top of which an anchoring layer is disposed. The anchoring layer forms a structure element for a filler mass to be introduced in the top of the build-up system. The mass is plastic during processing and hardens afterwards. A reinforcement layer is disposed on top of and rigidly connected with the anchoring layer, at least in sections.

23 Claims, 5 Drawing Sheets

MULTI-LAYER BUILD-UP SYSTEM FOR FLOOR COVERINGS WHEN USING FLOOR HEATING SYSTEMS

BACKGROUND OF THE INVENTION

1. Field of the Invention

The present invention relates to a multi-layer build-up system for floor coverings when using floor heating systems, particularly for laying ceramic floor coverings using the thin-bed method.

2. The Prior Art

Ceramic floor coverings and tiles, in particular, are usually laid using the so-called thin-bed method, in which the ceramic floor coverings are laid into a thin adhesive layer consisting of a tile mortar. This method, which is satisfactory for normal substrates such as walls or screed, has disadvantages when laying ceramic floor coverings on floor heating systems, also called radiant heating systems, in that the ceramic floor covering is subject to special stresses because the conditions of the substrate are constantly changing due to the thermal stresses of the floor heating system. Therefore, a cast plaster screed is usually applied over floor heating systems, which screed is usually so thick that the screed can serve as a stable substrate for the ceramic floor covering, and is uncoupled from the varying expansion conditions in the region of the pipes of the floor heating system. For this purpose, a thickness of the screed of generally more than 45 mm, and usually more than 60 mm, is required, and this has the result that the floor structure is very high because of the floor heating system, the screed, and the ceramic floor covering. Here, it is difficult to have a total thickness of less than 100 mm, and therefore such floor heating systems tend to be used rather rarely, particularly in renovations. In addition, particularly in renovations, when wood floors are being renovated, for example, such substrates are not resistant to bending in and of themselves, but rather demonstrate corresponding deformability and elasticity, which is an additional disadvantage for laying ceramic floor tiles. Also, because of the differing expansion coefficients of substrate, thin-bed mortar, and ceramic floor covering resulting from the thermal stress due to the floor heating, it is difficult to manage the cracking behavior of the ceramic floor covering and the substrate. Therefore, cracks frequently occur in the tile floor covering, if the tile floor covering is firmly connected with the substrate.

Floor heating systems are known, and described, for example in German Patent Nos. DE 87 03 642 U1 and DE 81 07 402 U1, in which plate-shaped components of foamed materials such as Styrofoam or the like are used as a substrate and for accommodating the pipelines for the heating fluid, in which components grooves are provided for accommodating the pipelines. The plate-shaped components are laid at the laying location and therefore offer insulation of the floor heating system in a downward direction and accommodation channels for the pipelines systematically arranged over the laying area, by the grooves. For better distribution of the heat passed to the laying area by the pipelines, heat conduction elements in the form of heat-conductive sheets or the like, which are in heat-conductive contact with the pipelines, at least in sections, are provided on the top of the plate-shaped components. In order to apply a ceramic floor covering on substrates in a secure manner and free of cracks for the long term, it is necessary to cast a relatively thick screed layer onto the heat-conductive sheets and allow it to harden. Aside from the problem of the time-consuming hardening phase of the screed, such a floor structure having a thick screed layer has the disadvantage that the floor heating system reacts relatively slowly, since the thick screed layer always has to be heated up first, before useful heat can be introduced into the space that lies above it. Especially during transitional seasons or in the case of constantly changing need for heat, this is a disadvantage.

SUMMARY OF THE INVENTION

It is therefore an object of the present invention to further develop a build-up system for floor coverings when using floor heating systems, in such a manner that an improvement in the mechanical ability to withstand stress and the anchoring on the tile layer can be achieved, while simultaneously reducing the required layer thicknesses to improve the process of laying ceramic floor coverings over floor heating systems.

This object is accomplished according to the invention by a multi-layer build-up system for floor coverings when using floor heating systems, particularly for laying ceramic floor coverings using the thin-bed method, having, on the underside, an essentially plate-shaped component for planar laying and for the accommodation of pipelines of a floor heating system. Accommodation spaces for the pipelines are formed in the component. An uncoupling mat is disposed on the surface of the plate-shaped component, and has an uncoupling layer, preferably in the manner of a nonwoven textile. On top of the uncoupling layer is an anchoring layer made of nonwoven textile and forming a structure element for a filler mass such as tile adhesive to be introduced in the region of the top of the build-up system. This mass is plastic during processing and hardens afterwards. On top of the anchoring layer is a reinforcement layer that is disposed rigidly connected with the anchoring layer, at least in sections.

An essentially plate-shaped component for planar laying and for the accommodation of pipelines of a floor heating system is understood, in the sense of this invention, as any type of floor superstructures that form an essentially level upper contact surface for a floor covering and in which space for conducting the pipelines of the floor heating system is kept clear or provided. Thus, a plate-shaped component in this sense can also be understood to be, for example, a profiled film provided with elevations, a Styrofoam panel provided with groove-like depressions for the pipelines, contact stilts having a spacer function, separate spacers, or also a pipeline laid in elevated manner on a screed, if this pipeline is subsequently surrounded with a material that forms a level surface. The only thing that is important in this connection is that the plate-shaped component can accommodate the pipelines and has an essentially level surface on which the uncoupling mat can be applied, and which brings with it a corresponding stability against stresses.

A structural element in the sense of this invention is understood as any type of space-holding component in which the filler mass that can be plastically introduced and hardens in the structural element can be accommodated, by means of the formation of cavities in the anchoring layer, thereby making it possible for the filler mass to connect with the structural element in a particularly intimate manner, entering into a very stable and stress-resistant connection. This is also a significant difference as compared with the known dry screed systems, which are simply glued flat onto a substrate that accommodates the pipelines, and do not enter into any particularly firm connection with a ceramic floor covering, for example, on the top, either. In contrast to this, the anchoring layer will enter into a very strong connection with the filler mass on the top, which mass in turn is firmly connected with the floor covering after it hardens. In this connection, not only a ceramic floor covering but any kind of glued floor covering, e.g. also floor coverings of wood or wood materials, can be used, in which damage could be caused by means of the stresses in the floor structure due to the floor heating.

Such a build-up system with the uncoupling mat has the significant advantage, as compared with known build-up systems, in that it has a very small layer thickness despite great permissible ability to withstand stress, which thickness guarantees that the tensions and expansions in the floor structure that are constantly changing and are introduced possibly on the substrate side or on the part of the floor heating system are reliably kept away from the layer of the ceramic floor covering. This also allows for a low build-up height of the entire build-up system, which could not be achieved until now. For this purpose, the uncoupling mat, because of its structure and the filling of the anchoring layer with the filler mass, forms a sandwich structure that is thin, in terms of layers, but nevertheless very stable, with a load distribution layer in the form of the anchoring layer and the uncoupling layer. The stiffening of the anchoring layer by the filler mass that is usually configured as a tile adhesive, and introduction of the mass into the anchoring layer while simultaneously applying the ceramic covering, for example, stiffens the uncoupling mat after the filler mass has hardened, so that strength properties of the uncoupling mat approach those of significantly thicker screed layers and partly exceeds them. In this way, the same or greater strength can be achieved at a significantly lesser thickness of the entire build-up system than in the case with the conventional design of such build-up systems. In addition, because of the combination of the uncoupling mat with the surface of the plate-shaped component or a heat-conductive layer that might be applied to the surface of the plate-shaped component, usually formed from aluminum sheets, temperature expansions of this plate-shaped component or the heat-conductive layer are effectively uncoupled from the layer of the ceramic floor covering, for example, and therefore no cracks can form even after extended operating times of the floor heating system. In this connection, the anchoring layer disposed on the top, and the reinforcement layer laid on top of it and attached to it ensure that a tile adhesive applied on the top as a filler mass connects completely with the uncoupling mat, and ensures the corresponding ability of the build-up system to withstand stress. In this connection, the grid-like structure element allows a particularly simple structure of the anchoring layer, which essentially determines the thickness of the uncoupling mat. Likewise, using such a build-up system, it is possible to install a floor heating system almost without waiting times, since only the short drying times of the tile adhesive must elapse, and no long hardening times of the screed, which is applied wet, have to elapse.

Another advantage is that because of the complete filling of the anchoring layer with the filler mass, improved heat conduction into a space disposed above it can be achieved. If, in the case of other uncoupling mats, the work is carried out using diverse spacers, the space kept clear by the spacers can generally not be filled completely, and therefore a plurality of air-filled cavities remain between the plate-shaped component and the floor covering after laying. However, these air-filled cavities act as insulators and thereby clearly worsen the emission of heat to the space to be heated.

It is advantageous if the uncoupling layer is connected with the surface of the plate-shaped component in a planar manner, preferably by means of an adhesive and, in particular, a flexible tile adhesive. Because the uncoupling mat is glued to the surface of the plate-shaped component, preferably over its full area, the part of the build-up system disposed on the top is securely anchored on the part of the build-up system disposed on the bottom, for one thing, and for another, stresses or displacements that occur due to the temperature expansions of the plate-shaped component cannot reach the ceramic floor covering disposed on the top of the uncoupling mat, because of the uncoupling function of the uncoupling mat, and cannot develop the harmful effects there that were described above. At the same time, because the uncoupling mat is glued to the substrate, the ceramic floor covering also cannot permanently come loose from the substrate of the build-up system, so that great bonding strength of the ceramic floor covering over time is also achieved.

In another embodiment, the uncoupling layer, with the anchoring layer disposed on it, lies loosely on the surface of the plate-shaped component. In this way, in contrast to the gluing described above, uncoupling of the ceramic floor covering is achieved so that the anchoring layer filled with the filler material, which layer is very rigid and strong in itself, lies on the surface of the plate-shaped component as a plate-like floating layer, and therefore permits stresses or displacement to occur in the substructure without any impairment of the ceramic floor covering. The great strength values of the uncoupling mat fundamentally allow such a laying method.

In one embodiment, the structure element of the uncoupling mat is formed as a grid-like structure element of rod-shaped individual rods disposed in a grid-like manner relative to one another and fixed on one another at the intersection points of the grid. Such a grid-like structure element can be produced simply from individual rods of the same type, which can be pre-finished. It is therefore possible to process inexpensively extruded individual rods that are wound up on drums and positioned relative to one another for the production of the grid-like structure elements. In this way, the production of such a grid-like structure element is very inexpensive and simple. In contrast to known uncoupling mats, it is not necessary to produce complicated tools that produce regions that are angled away from one another or otherwise deformed. In this connection, in a further embodiment, the individual rods of the grid-like structure element have an essentially rectangular cross-sectional shape. Particularly if the individual rods have non-uniform dimensions of their edges, the thickness of the grid-like structure elements can be changed in a simple manner, and adapted to different needs.

It is particularly advantageous if the intersecting individual rods of the grid-like structure element are disposed in such a manner that a first layer consists of individual rods oriented the same way below a second layer of individual rods oriented the same way relative to one another disposed at an angle to the first. Thus, the need for interlocking the individual rods relative to one another as in the case of woven textiles, is eliminated in the production of the grid-like structure. This further simplifies production and ensures that the similar layers of the upper and lower layer of the individual rods form corresponding clear spaces between them which can be used for introducing the filler mass. In this connection, the grid-like structure of individual rods can have a diamond shape, rectangle shape, or square shape. Of course, other geometric patterns are also possible.

A further simplification can be achieved if the individual rods of the two layers are bonded to one another in the intersection region, under mechanical pressure. For example, by heating the individual rods that can be plastically deformed by means of temperature influence, softening and bonding with the individual rod that lies underneath takes place in the contact region of the individual rods, and therefore a mat-like composite of the individual rods occurs.

Furthermore, in the case of bonding of the individual rods, for example, the individual rods of the grid-like structure element can have edge regions tilted relative to one another, at least at the intersection points, thereby forming undercut sections on the individual rods. Via the plastic deformation of the individual rods in the region of the intersection points from heating, the individual rods are slightly deformed by the mechanical pressure, and thereby change their orientation as a function of the position of the other individual rod to be connected with the individual rod. This leads to the result that undercuts occur, which are particularly advantageous for anchoring in the filler mass, for example. Because of its plasticity, the filler mass penetrates into these undercuts during processing, and can hold to the anchoring layer significantly better after it has hardened, because of the undercuts of the individual rods.

Furthermore, in another embodiment, the reinforcement layer is bonded or glued onto the anchoring layer. In this way, the reinforcement layer can be embedded well into the filler mass and it holds tightly to the anchoring layer, which is also filled with the filler mass. As a result, there is a particularly good bond between the filler mass and the reinforcement layer and the anchoring layer, respectively. The reinforcement layer can be formed as a grid-like woven textile, preferably as a glass fiber woven textile, which serves for secure anchoring with the filler mass to be introduced on the top of the uncoupling mat.

It is advantageous for the processing of larger areas of the build-up system if the reinforcement layer extends beyond the other layers, at least in individual edge regions, so that a transition to other sections of the build-up system is created. In this way, a correspondingly overlapped connection at the edges of webs that can be processed individually can be achieved, which connection does not result in any loss in strength at the transition regions between adjacent webs.

The thickness of the anchoring layer preferably amounts to between 2 and 6 millimeters, and therefore, in one embodiment, the total thickness of the uncoupling mat amounts to essentially between 2 and 8 millimeters. As a result, the build-up system does not have more than an absolutely necessary height above a given substrate, and can be used without problems even in installation conditions allowing little space.

It is a significant advantage for the usage properties of the uncoupling mat according to the invention if the anchoring layer is filled with the filler mass essentially completely after the filler mass has been introduced, and the reinforcement layer embedded in the hardened filler mass fulfills a stiffening and reinforcement function for the transfer of mechanical stresses introduced from above. In this way, load transfer over significantly greater layer thicknesses is possible as compared to known uncoupling mats, since in addition, the entire layer thickness of the anchoring layer provides support in case of mechanical stresses, and, at the same time, it is reinforced by the reinforcement layer.

It is advantageous if the plate-shaped component consists of a foam-like material, particularly a foamed polystyrene such as STYROFOAM®, or a similar material. Such a foam material is light and offers heat insulation downward from the build-up system, and thereby improves the heat balance of the build-up system.

For improving the heat emission of the floor heating system, a heat-conductive layer can be disposed on the surface of the plate-shaped component, which layer stands in a heat-conductive connection with the pipelines. The heat-conductive layer can be formed from individual heat-conductive sheets, for example, which are produced from a material that conducts heat well, particularly from aluminum, and which distribute the heat coupled out of the pipelines over a large area, over the entire floor, and thereby increases the size of the floor regions that participate in the heat transfer. The heat-conductive sheets can cover the surfaces of a build-up system laid with plate-shaped components in the manner of tiles, for simpler assembly, and each sheet can have at least one contact region to a pipeline to improve the heat coupling.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
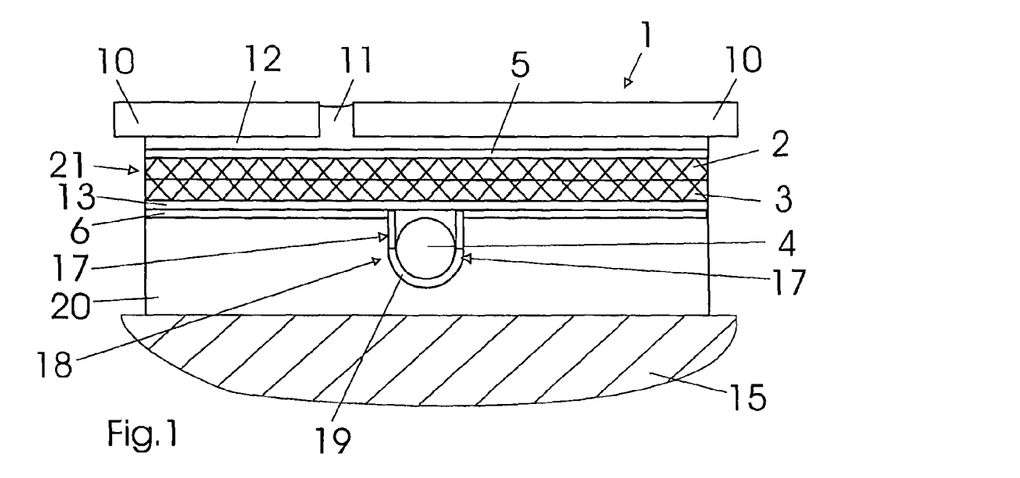
FIG. 1 shows a section through a build-up system according to one embodiment of the invention, having a grid-like structure element on a plate-shaped component formed from foam material, to explain the layer structure.
Figure 2:
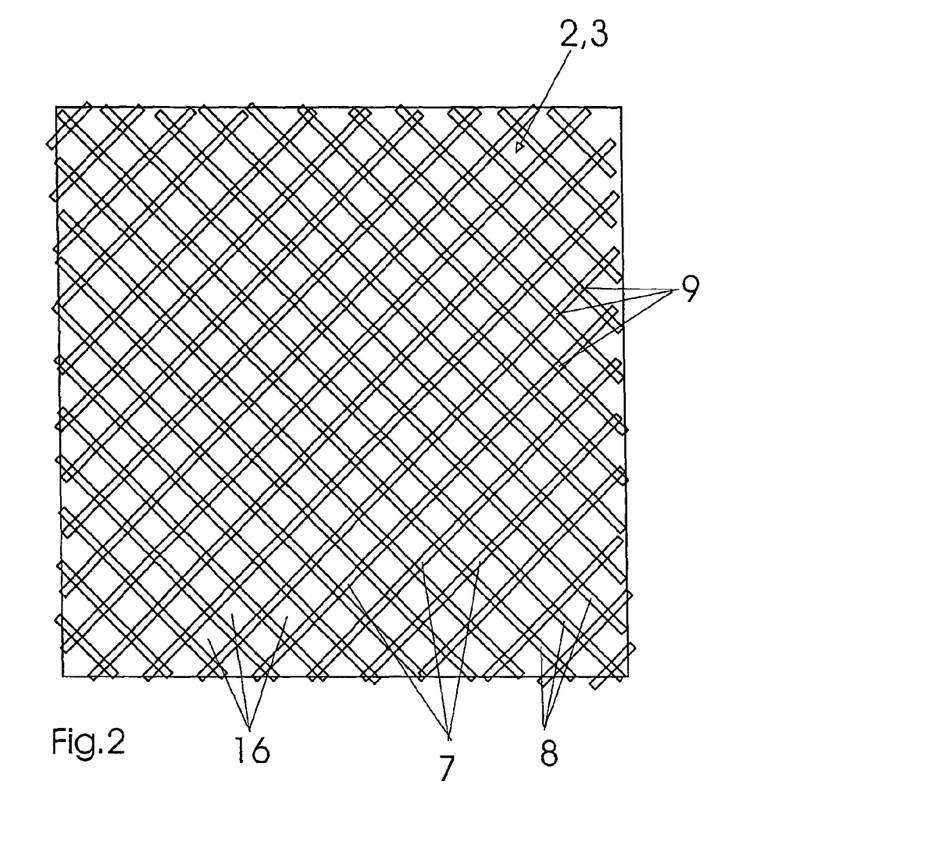
FIG. 2 shows a top view of an uncoupling mat according to the invention, in accordance with FIG. 1.

Referring now in detail to the drawings, FIG. 1 shows a sectional side view of a multi-layer build-up system 1 according to the invention, and in FIG. 2, a sectional top view can be seen, approximately at the height of an anchoring layer 3 provided with a grid-like structure element. In FIG. 1, build-up system 1 is shown in the installed state, on a substrate 15, for example a wood floor or the like. Above build-up system 1, a tile covering of tiles 10 can be seen, which has been laid in a tile adhesive 12, using the thin-bed method. The joins 11 between individual tiles 10 are also filled with tile adhesive 12 or a join cement.

Figure 4:
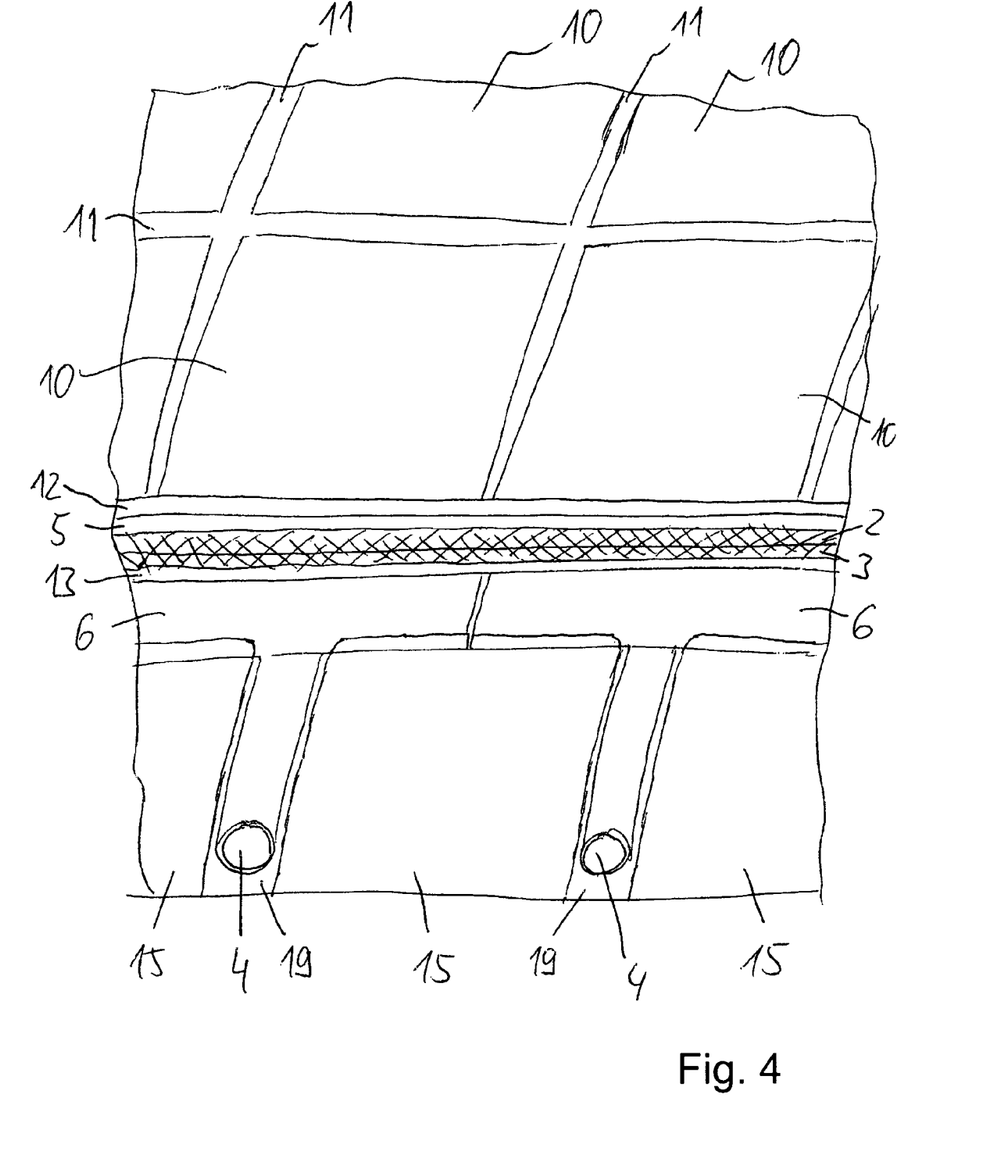
FIG. 4 shows a cross-sectional view of the system mounted on a substrate.

Build-up system 1 according to the invention consists of a plate-shaped component 20, for example made of a heat-insulating foam material, which lies on substrate 15. Component grooves 19 are recessed on the top of component 20, in a known manner, in a laying pattern that is not of further relevance here, or a section of it, to accommodate a pipeline 4. Pipeline 4 is a component of a circuit through which heat carrier media flow, and the heat is given off to the surroundings in the region of plate-shaped component 20. Heat-conductive sheets 6, which conduct heat well, and are disposed on the surface of plate-shaped component 20 on the room side, essentially over the entire area, in the form of individual tiles, as shown in FIG. 4, serve to improve the heat conduction and thereby the heat transfer into a space situated above build-up system 1. An edge region of heat-conductive sheets 6 projects into the interior of groove 19 with an angled region 17, and rests against pipeline 4 with heat-conductive contact, so that the heat given off by pipeline 4 is passed to heat-conductive sheets 6 by way of angled region 17, and from there distributed over the entire area.

An uncoupling mat 21 is disposed lying on heat-conductive sheets 6 and, if applicable, glued to heat-conductive sheets 6 over their full area, which mat serves to uncouple the layer of tiles 10 from plate-shaped component 20 and heat-conductive sheets 6. This uncoupling mat 21 has an uncoupling layer 13, preferably in the manner of a nonwoven textile, which is formed from polyethylene, for example, on the underside and lying directly on heat-conductive sheets 6. In this connection, uncoupling layer 13 can be glued to heat-conductive sheets 6 by means of a flexible adhesive, but it is also possible to lay uncoupling layer 13 onto heat-conductive sheets 6 in floating manner, to uncouple heat-conductive sheets 6 and tile covering from tiles 10. Such laying methods are fundamentally known and will therefore not be discussed further here.

Above uncoupling layer 13, an anchoring layer 2, 3 of a grid-like structure that will be explained below is connected with uncoupling layer 13. The connection can take place in a known manner, for example by means of gluing or bonding, depending on the materials used. Anchoring layer 2, 3 is formed from two individual layers 2, 3.

Figure 3:
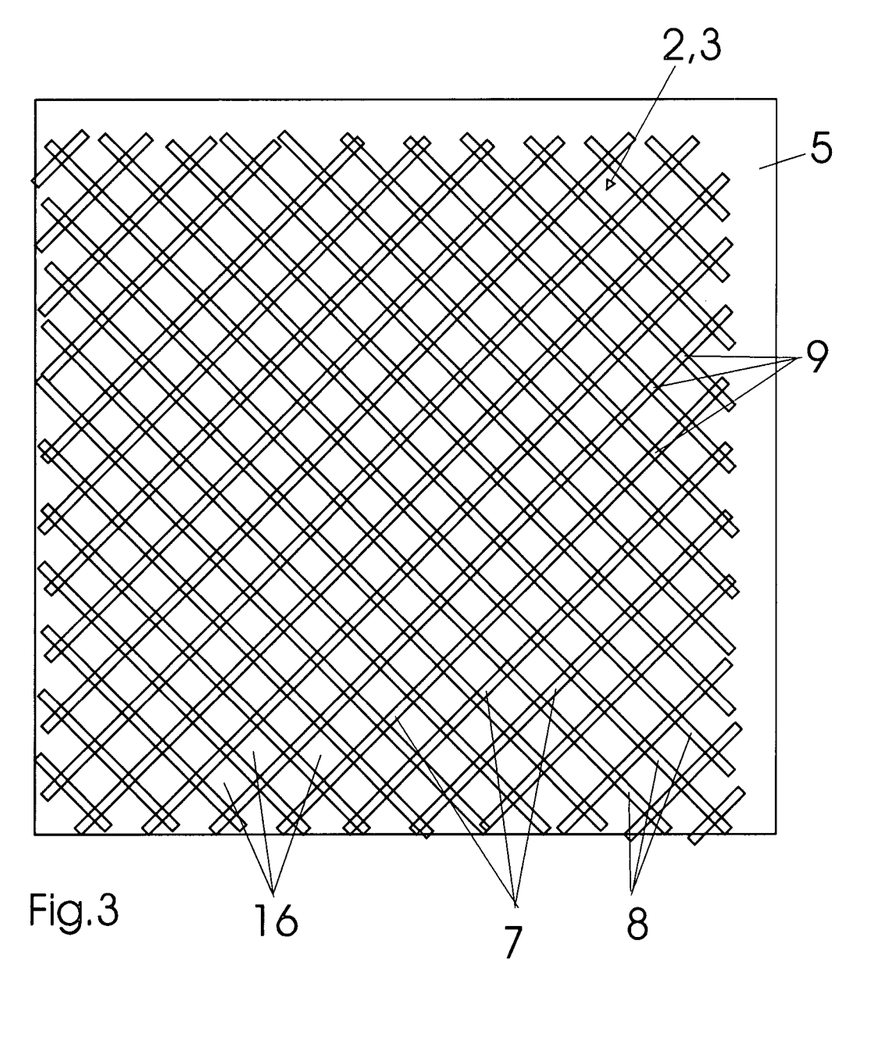
FIG. 3 shows the structure of the uncoupling mat.
Figure 5:
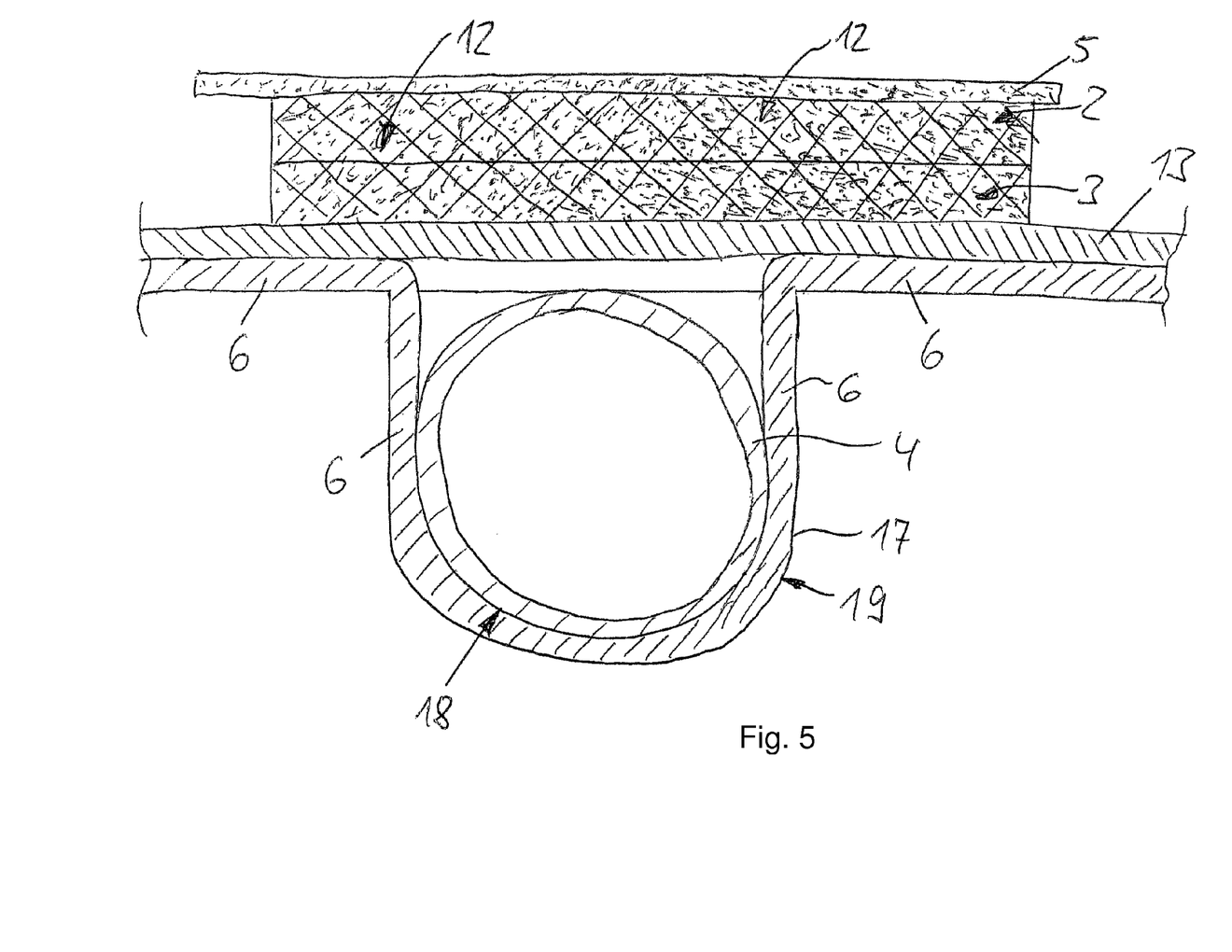
FIG. 5 shows a cross-sectional view of the system of FIG. 1.

Anchoring layer 2, 3, just like reinforcement layer 5 connected with it and disposed above it, serves to anchor build-up system 1 to the preferably elastic tile adhesive 12 and therefore the layer of tiles 10. Reinforcement layer 5 can consist of a glass fiber woven textile disposed in a grid-like manner, as shown in FIGS. 2 and 3, which has corresponding openings and clear regions so that tile mortar 12 can enter as deeply as possible into anchoring layer 2, 3. Reinforcement layer 5 extends beyond the other layers at least in individual edge regions, to create a transition to other sections of the build-up system, as shown in FIG. 5.

Anchoring layer 2, 3 has accommodation spaces 16 for tile adhesive 12, in a manner that will be explained in greater detail below, and thereby serves to improve the anchoring of tile adhesive 12 on multi-layer build-up system 1.

Fixation of the tile layer of tiles 10 takes place by applying tile adhesive 12 to the top of reinforcement layer 5 before tiles 10 are laid down, and pressed as deeply as possible through the openings of reinforcement layer 5 into anchoring layer 2, 3, using a trowel. When this is done, tile adhesive 12, which is processed in the plastic state, fills accommodation spaces 16 in anchoring layer 2, 3, to a great extent, and flows almost completely around individual rods 7, 8 of anchoring layer 2, 3, which are formed in a manner that will be described in greater detail below. After tile adhesive 12 has hardened, a very firm connection between anchoring layer 2, reinforcement layer 5, and tile adhesive 12 has formed, which firmly anchors tiles 10 on build-up system 1, and brings about a stable, plate-like configuration of anchoring layer 2, 3, as shown in FIG. 5. As a result, build-up system 1 is particularly able to withstand stress cause by mechanical stresses applied on the top of tiles 10.

The grid-like structure of the anchoring layer 2, 3 is formed from individual rods 7, 8 disposed at an angle to one another, which form a two-ply layer arrangement of layers 2 and 3, disposed on top of one another. Individual rods 7, 8 each have an approximately rectangular cross-section and are bonded to one another by thermal methods, for example, at intersection points 9. In this way, an arrangement of approximately parallel groups of individual rods 7 on top of one another is formed, in the simplest possible manner, which are connected with groups of individual rods 8, also parallel to one another, which lie at an angle to the group of individual rods 7. Accommodation spaces 16 in anchoring layer 2, 3 are formed between individual rods 7 and 8, respectively.

The grid-like structure of individual rods 7, 8 furthermore has the advantage that regions having undercuts form in individual rods 7, 8 in the region of intersection points 9 when individual rods 7, 8 are bonded, therefore leading to very strong attachment of tile mortar 12 that enters into these regions to individual rods 7, 8, after it hardens.

Figure 6:
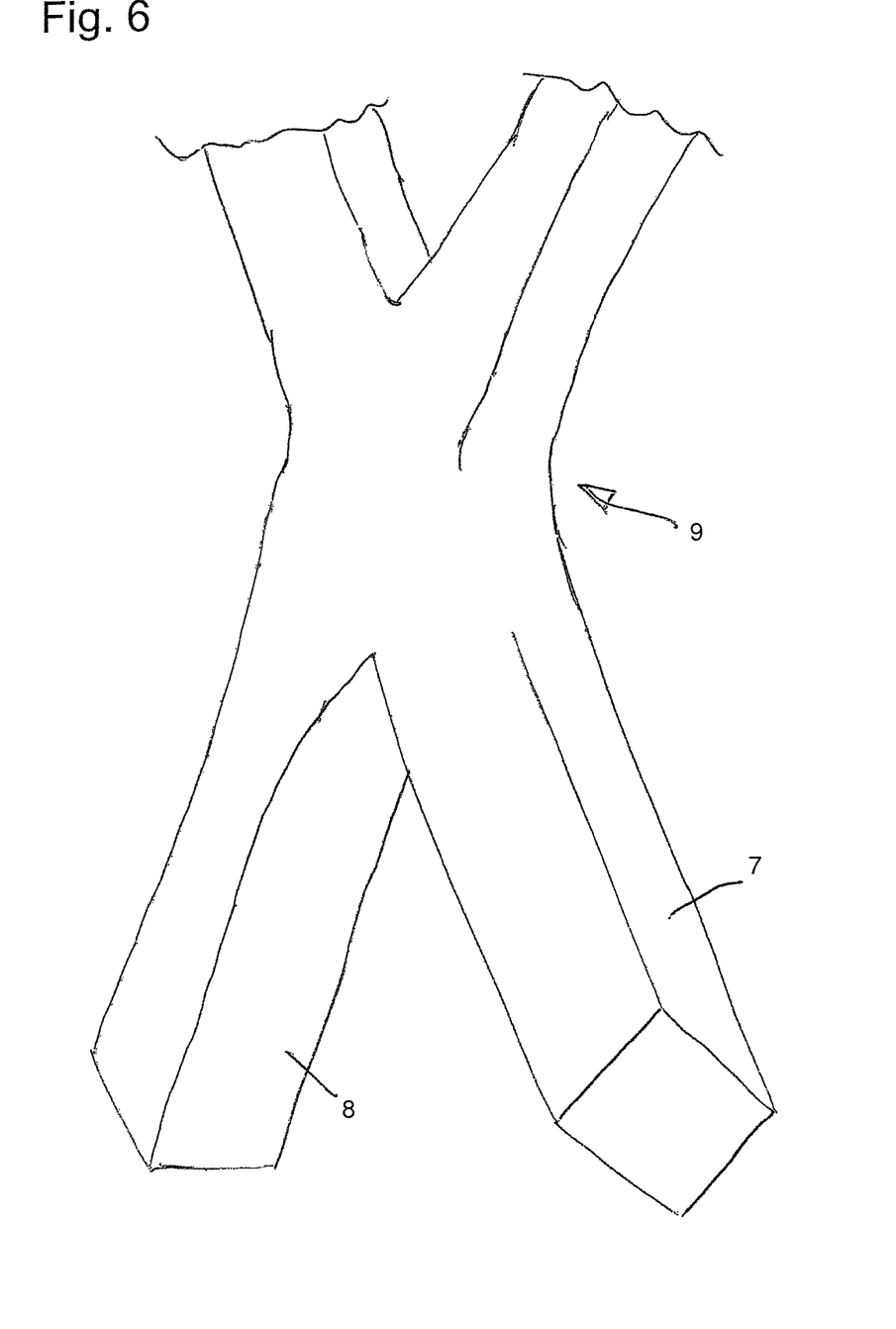
FIG. 6 shows the rod system of FIG. 3 but arranged in a diamond pattern.

It is understood that the arrangement of individual rods 7, 8 shown in FIG. 2 is to be viewed as being only an example, and that any type of geometrical patterns of such individual rods 7, 8 can be formed, which is advantageous for the properties of the uncoupling mat 13 indicated here. Each individual rod preferably has a rectangular cross-section, as shown in FIG. 6.

Accordingly, while only a few embodiments of the present invention have been shown and described, it is obvious that many changes and modifications may be made thereunto without departing from the spirit and scope of the invention.

REFERENCE NUMBER LIST

1—build-up system
2—anchoring layer
3—anchoring layer
4—pipeline
5—reinforcement layer
6—heat-conductive sheet
7—individual rod
8—individual rod
9—intersection region
10—tile
11—join
12—tile adhesive
13—uncoupling layer in the manner of a nonwoven textile
14—overlapping region
15—substrate
16—accommodation spaces
17—angled region of heat-conductive sheet
18—contact of heat-conductive sheet/pipeline
19—groove
20—plate-shaped component
21—uncoupling mat

What is claimed is:

1. A multi-layer build-up system for floor coverings, comprising:
    a plate-shaped component having accommodation spaces for pipelines of a floor heating system;
    an uncoupling mat disposed on an upper surface of the plate-shaped component, said uncoupling mat comprising an uncoupling layer and at least one anchoring layer;
    said uncoupling layer being formed of a nonwoven textile and connected with a surface of the plate shaped component by a flexible adhesive;
    a tile adhesive that is plastic during processing and hardened afterwards;
    said anchoring layer being disposed on top of the uncoupling layer, said anchoring layer comprising accommodation spaces for receiving plastic tile adhesive; and
    a reinforcement layer disposed on top of the anchoring layer, at least in sections, said reinforcement layer comprising openings for receiving plastic tile adhesive;
    wherein hardened tile adhesive, the reinforcement layer, and the at least one anchoring layer form a unitary composite body that is resistant to bending after the tile adhesive in a plastic state has been applied through the openings in the reinforcement layer and accommodation spaces of the anchoring layers and the tile adhesive has hardened, so that a floor covering applied on top of the build-up system is unaffected by changes in a substrate and/or the plate-shaped component that occur underneath the floor covering and guides heat undisturbed from the pipelines to the floor covering.

2. A build-up system according to claim 1, wherein the uncoupling layer is connected with the surface of the plate-shaped component by a flexible adhesive.

3. A build-up system according to claim 2, wherein the adhesive is a flexible tile adhesive.

4. A build-up system according to claim 1, wherein the uncoupling layer with the anchoring layer disposed on it lies loosely on the surface of the plate-shaped component.

5. A build-up system according to claim 1, wherein the anchoring layer together with the filler mass forms a composite body resistant to bending, so that a floor covering applied on top of the build-up system is unaffected by changes in a substrate and/or the plate-shaped component that occur underneath the floor covering.

6. A build-up system according to claim 1, wherein the structure element is a grid structure element.

7. A build-up system according to claim 6, wherein the grid structure element is formed from individual rods that are disposed in grid manner relative to one another, and fixed in place on one another at intersection points of the rods.

8. A build-up system according to claim 7, wherein each individual rod of the grid structure element has an essentially rectangular cross-sectional shape.

9. A build-up system according to claim 7, wherein the individual rods of the grid structure element are disposed in such a manner that a first layer consists of individual rods oriented the same way, below a second layer of individual rods oriented the same way relative to one another and disposed at an angle to the first layer.

10. A build-up system according to claim 9, wherein the grid structure of individual rods forms a pattern of diamond shapes, rectangle shapes, or square shapes.

11. A build-up system according to claim 9, wherein the individual rods of the two layers are bonded to one another in an intersection region under mechanical pressure.

12. A build-up system according to claim 11, wherein the individual rods of the grid structure element have edge regions tilted relative to one another, at least at intersection points, thereby forming undercut sections on the individual rods.

13. A build-up system according to claim 1, wherein the reinforcement layer is bonded onto the anchoring layer.

14. A build-up system according to claim 1, wherein the reinforcement layer is glued onto the anchoring layer.

15. A build-up system according to claim 1, wherein the reinforcement layer is formed of a grid woven textile for anchoring with the filler mass.

16. A build-up system according to claim 1, wherein the reinforcement layer extends beyond the other layers at least in individual edge regions, to create a transition to other sections of the build-up system.

17. A build-up system according to claim 1, wherein a thickness of the anchoring layer amounts to between 2 and 6 millimeters.

18. A build-up system according to claim 1, wherein a total thickness of the uncoupling mat amounts to between 2 and 8 millimeters.

19. A build-up system according to claim 11 wherein the anchoring layer is completely filled with the filler mass and wherein the reinforcement layer is embedded in the filler mass so that when the filler mass is hardened, the reinforcement layer fulfills a stiffening and reinforcement function for the transfer of mechanical stresses introduced from above.

20. A build-up system according to claim 11 wherein the plate-shaped component consists of a material.

21. A build-up system according to claim 11 wherein the plate-shaped component has accommodation grooves that are on a top of the build-up system, after laying, and open in a direction towards the floor covering.

22. A build-up system according to claim 11, further comprising a heat-conductive layer disposed on a surface of the plate-shaped component, said layer standing in a heat-conductive connection with pipelines of the floor heating system when said build-up system is installed with a floor-heating system.

23. A build-up system according to claim 22, wherein the heat-conductive layer is formed from individual heat-conductive sheets, which are produced from a conductive material.

* * * * *